United States Patent [19]

Behrle

[11] Patent Number: 4,669,214
[45] Date of Patent: Jun. 2, 1987

[54] BELT BUCKLE/FISHING ROD HOLDER

[76] Inventor: William L. Behrle, 385 Grand Terrace Ct., Fenton, Mo. 63026

[21] Appl. No.: 848,636

[22] Filed: Apr. 7, 1986

[51] Int. Cl.$^4$ ............................................. A01K 97/10
[52] U.S. Cl. ..................................................... 43/21.2
[58] Field of Search ........................... 43/21.2, 23, 25; 224/922, 163; 24/163 R, 163 K, 164; D2/380, 381, 393, 394; D11/166, 182

[56] References Cited

U.S. PATENT DOCUMENTS

| 1,451,732 | 4/1923 | Hipwood | 224/922 |
|---|---|---|---|
| 3,855,637 | 12/1974 | Luger | 24/163 R |
| 3,917,134 | 11/1975 | Tumlinson | 224/922 |
| 4,113,157 | 9/1978 | Woodburg | 24/163 K |
| 4,466,561 | 8/1984 | Slaughter | 24/163 K |
| 4,481,712 | 11/1984 | Phelps | 24/163 K |
| 4,562,620 | 1/1986 | Oliver | 24/163 K |
| 4,565,025 | 1/1986 | Behrle | 43/21.2 |
| 4,587,757 | 5/1986 | Lirette | 43/21.2 |

Primary Examiner—M. Jordan
Attorney, Agent, or Firm—Rogers, Howell, Moore & Haferkamp

[57] ABSTRACT

A belt with a buckle having a rigidly attached socket member to receive the shank of a fishing rod holder. A fishing rod may be inserted or removed to provide a place for the fishing rod to be held and that frees the hands of the fisherman.

5 Claims, 3 Drawing Figures

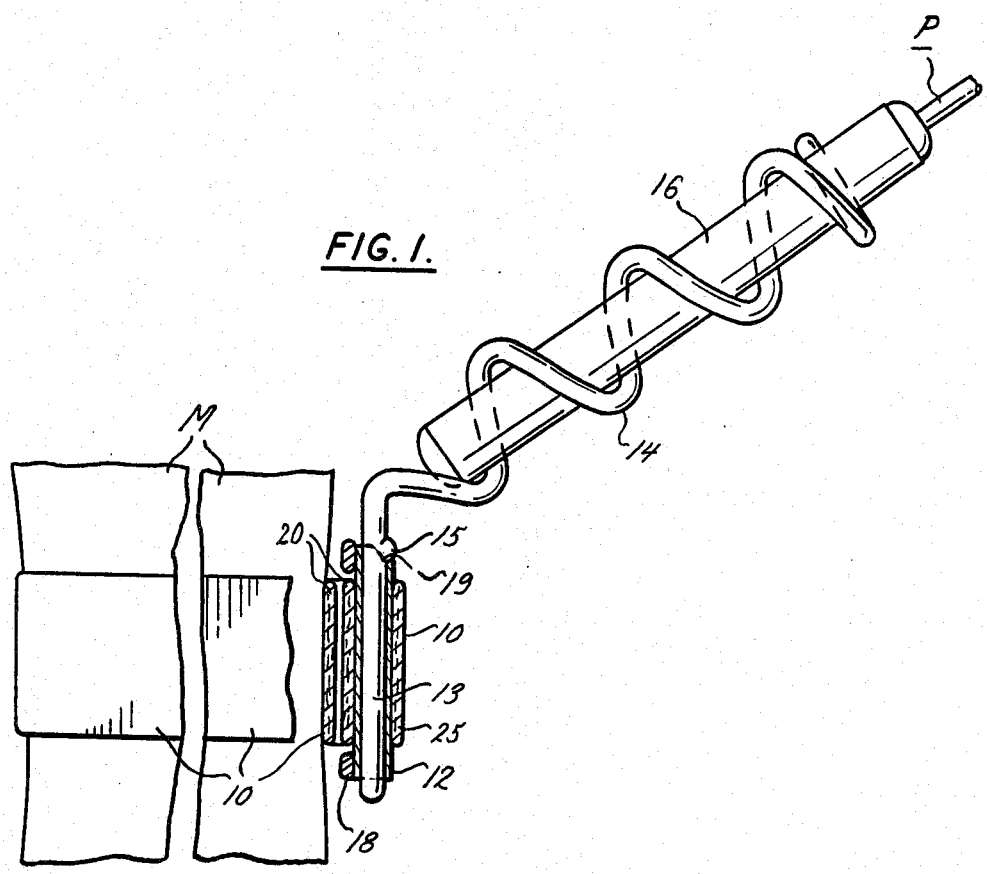
FIG. 1.
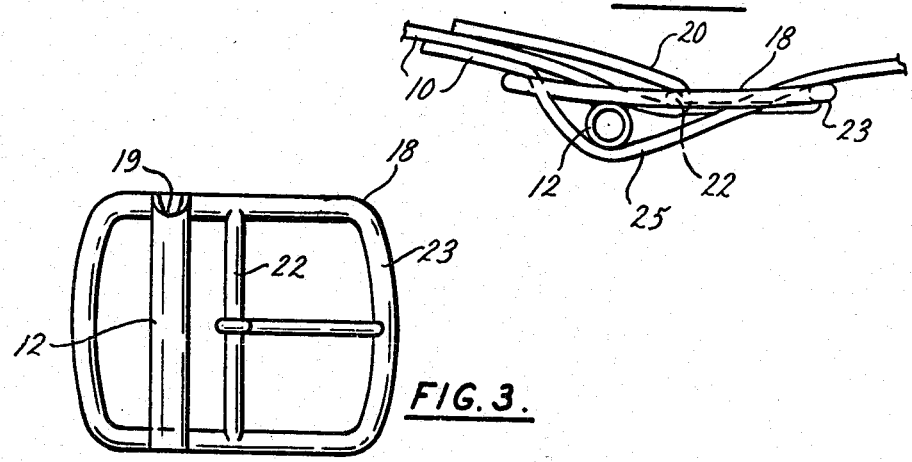
FIG. 2.
FIG. 3.

BELT BUCKLE/FISHING ROD HOLDER

BACKGROUND AND SUMMARY OF THE INVENTION

The present invention broadly provides a means attached to the waist of the user to hold a fishing pole and to free both hands of the user so that he can perform other tasks that require both hands. For example, it enables him to re-bait his hook while he is wading for fishing. In the preferred form it consists of a belt having a buckle with a socket or tube permanently attached to the buckle as by welding, the socket being adapted to receive the shank of a fishing pole holder. This has the advantage of being relatively rigid and strong and resistant to twisting and turning actions that might be caused by the weight of the fishing rod. In that connection, the socket tube may be made long enough to insure that the weight of the pole will not turn the buckle down to release the pole.

The device here is illustrated with a leather belt and with a type of fishing rod holder such as that represented by U.S. Pat. No. 4,565,025 of Jan. 21, 1986.

Reference also made to the art cited in that case.

IN THE DRAWINGS

FIG. 1 is a side elevation partly in section showing how the device is mounted on the belt of the user;

FIG. 2 is an elevation of the buckle alone with the tube mounted thereon; and

FIG. 3 is a top view of the buckle and the belt but without the holder in place in the tube.

DESCRIPTION OF PREFERRED EMBODIMENT

As shown in FIG. 1, a man M has a belt 10 around his waist. The buckle of this belt has a tube 12 into which the shank 13 of a fishing rod handle holder 14 can be inserted or withdrawn. The shank 13 has a nub 15 that is integral with it for a purpose to appear. The holder 14 is here shown as one of the spiral type to receive the handle 16 of a fishing pole P (see U.S. Pat. No. 4,565,025).

As shown in FIG. 2, the belt buckle 18 has the tube 12 welded thereto, preferably being in recesses as shown. The tube 12 has a notch 19 for a purpose later to appear. The belt has its attached end 20 conventionally looped around the fixed bar 22 that is part of the buckle frame. The belt has an opening to admit the tongue 23 of the buckle. After looping around the bar 22, the end of the belt is looped back on itself and riveted or otherwise secured.

The free end of the belt 25 is brought around the wearer's waist through the buckle until the appropriate hole is adjacent the tongue 23 of the buckle, and is attached over the tongue. The free end of the belt 25 is brought over the tube 12 and then back through the buckle and out, as shown in FIG. 3.

The notch 19 in the tube 12 is adapted to receive the nub 15 or the like on the shank 13 of the holder 14. Thus, when the shank is inserted into the tube 12, as shown in FIG. 1, the nub 15 can fit into the notch 19 to prevent the pole from swinging around.

While certain advantages of the present invention can be obtained by other arrangements, such as having a clip for the tube that fits over the waistband of the trousers of the user, the present arrangement provides a relatively rigid device for holding the pole, since it is fixed to the buckle of the belt that is normally of rigid material such as metal and therefore it is less likely to twist under the weight of the fishing pole. Where the attachment is made to the belt buckle with the belt attached thereto, the likelihood of twisting in the fashion above described is reduced because the belt can be made as tight as necessary, and the tighter it is, the less chance there is for it to twist. In this connection, the tube 12 should be made long enough that it is less likely to twist the belt. It is not limited in its length to the width of the belt or belt buckle.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a belt buckle having a tubular member secured thereto in upright position, to receive removably the shank of a fishing pole holder, the shank and the tubular member being sufficiently small so as not to interfere with the user or with the buckle or its belt, when the fishing pole holder is not mounted therein, and wherein the belt buckle is of the style having a frame comprising parallel horizontal top and bottom members fixedly connected to side members and a connector for releasably attaching the ends of the belt together about the user, and wherein the tubular member is rigidly attached to the top and bottom members of the frame of the buckle.

2. The device of claim 1, the belt buckle having recesses to receive the tubular member and aid its being secured in position, the belt buckle having a tongue attached medially to the buckle frame, the tongue and its attachment being laterally displaced from the tubular member.

3. The device of claim 1 wherein the tubular member is long enough to minimize the chance of twisting of the tubular member under the weight of the fishing rod when the rod is in the rod holder.

4. In the device of claim 1 wherein the tubular member extends across the belt buckle frame in a vertical manner.

5. In the device of claim 4, the belt buckle having an outer frame of generally rectangular shape with a transverse bar to which a tongue is attached, the transverse bar being disposed across the midportion of the frame, the tubular member being spaced to the side of the transverse bar holding the tongue.

* * * * *